United States Patent
Boydens et al.

(10) Patent No.: US 11,740,632 B2
(45) Date of Patent: Aug. 29, 2023

(54) AGRICULTURAL SYSTEM

(71) Applicant: CNH Industrial America LLC, New Holland, PA (US)

(72) Inventors: Joachim Boydens, Zedelgem (BE); Thomas Debbaut, Ronsele (BE); Didier Verhaege, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 358 days.

(21) Appl. No.: 16/611,718

(22) PCT Filed: May 8, 2018

(86) PCT No.: PCT/EP2018/061901
§ 371 (c)(1),
(2) Date: Nov. 7, 2019

(87) PCT Pub. No.: WO2018/206592
PCT Pub. Date: Nov. 15, 2018

(65) Prior Publication Data
US 2020/0103904 A1    Apr. 2, 2020

(30) Foreign Application Priority Data
May 9, 2017  (BE) .................................. 2017/5336

(51) Int. Cl.
G05D 1/02       (2020.01)
A01B 69/04     (2006.01)
G05D 1/00       (2006.01)

(52) U.S. Cl.
CPC ......... *G05D 1/0212* (2013.01); *A01B 69/008* (2013.01); *G05D 1/0088* (2013.01); *G05D 2201/0201* (2013.01)

(58) Field of Classification Search
CPC .................................................... G05D 1/0212
See application file for complete search history.

(56) References Cited

U.S. PATENT DOCUMENTS

| | | | | |
|---|---|---|---|---|
| 4,206,587 A * | 6/1980 | Freimuth | ............ | A01F 15/0883 100/88 |
| 8,170,785 B2 * | 5/2012 | Diekhans | ............. | G05D 1/0291 701/25 |
| 8,234,033 B2 * | 7/2012 | Brubaker | ............. | G05D 1/0278 701/40 |

(Continued)

FOREIGN PATENT DOCUMENTS

| | | | | |
|---|---|---|---|---|
| EP | 1548531 A1 * | 6/2005 | ........... | A01B 69/008 |
| EP | 1548531 A1 | 6/2005 | | |

(Continued)

OTHER PUBLICATIONS

International Search Report and Written Opinion for Application No. PCT/EP2018/061901 dated Jun. 15, 2018 (11 pages).

*Primary Examiner* — Shelley Chen
(74) *Attorney, Agent, or Firm* — Peter Zacharias

(57) ABSTRACT

A system including a controller associated with an agricultural vehicle. The controller is configured to determine route-plan-data that is representative of a route to be taken by the agricultural vehicle in an agricultural field, based on bale-location-data. The bale-location-data is representative of the location of bales in the agricultural field.

17 Claims, 3 Drawing Sheets

(56) References Cited

U.S. PATENT DOCUMENTS

| | | | |
|---|---|---|---|
| 8,407,157 B2 * | 3/2013 | Anderson | A01G 23/00 701/50 |
| 9,096,977 B2 * | 8/2015 | Fritz | E01C 23/127 |
| 9,764,472 B1 * | 9/2017 | Ebrahimi Afrouzi | B25J 9/1694 |
| 2005/0197175 A1 * | 9/2005 | Anderson | A01G 23/00 460/1 |
| 2007/0175198 A1 * | 8/2007 | Viaud | A01F 15/0883 56/341 |
| 2007/0233374 A1 * | 10/2007 | Diekhans | A01B 69/008 701/50 |
| 2009/0265098 A1 * | 10/2009 | Dix | A01B 69/008 701/23 |
| 2010/0036569 A1 | 2/2010 | Hel et al. | |
| 2010/0288140 A1 * | 11/2010 | Smith | A01F 15/0715 53/507 |
| 2010/0318253 A1 * | 12/2010 | Brubaker | A01F 15/0833 701/25 |
| 2012/0112896 A1 | 5/2012 | Clair et al. | |
| 2014/0163806 A1 * | 6/2014 | Aznavorian | G05D 1/021 701/25 |
| 2014/0348584 A1 * | 11/2014 | Fritz | E01C 23/127 404/72 |
| 2016/0088797 A1 * | 3/2016 | De Baere | A01F 15/0715 53/399 |
| 2016/0113204 A1 * | 4/2016 | Rosseel | B65B 41/12 53/167 |
| 2018/0150078 A1 * | 5/2018 | Sugishita | G05D 1/0246 |
| 2018/0210451 A1 * | 7/2018 | Naik | G05D 1/0246 |
| 2018/0217611 A1 * | 8/2018 | Kim | A47L 11/4061 |

FOREIGN PATENT DOCUMENTS

| | | |
|---|---|---|
| WO | 2012112205 A1 | 8/2012 |
| WO | 2014137533 A2 | 9/2014 |

* cited by examiner

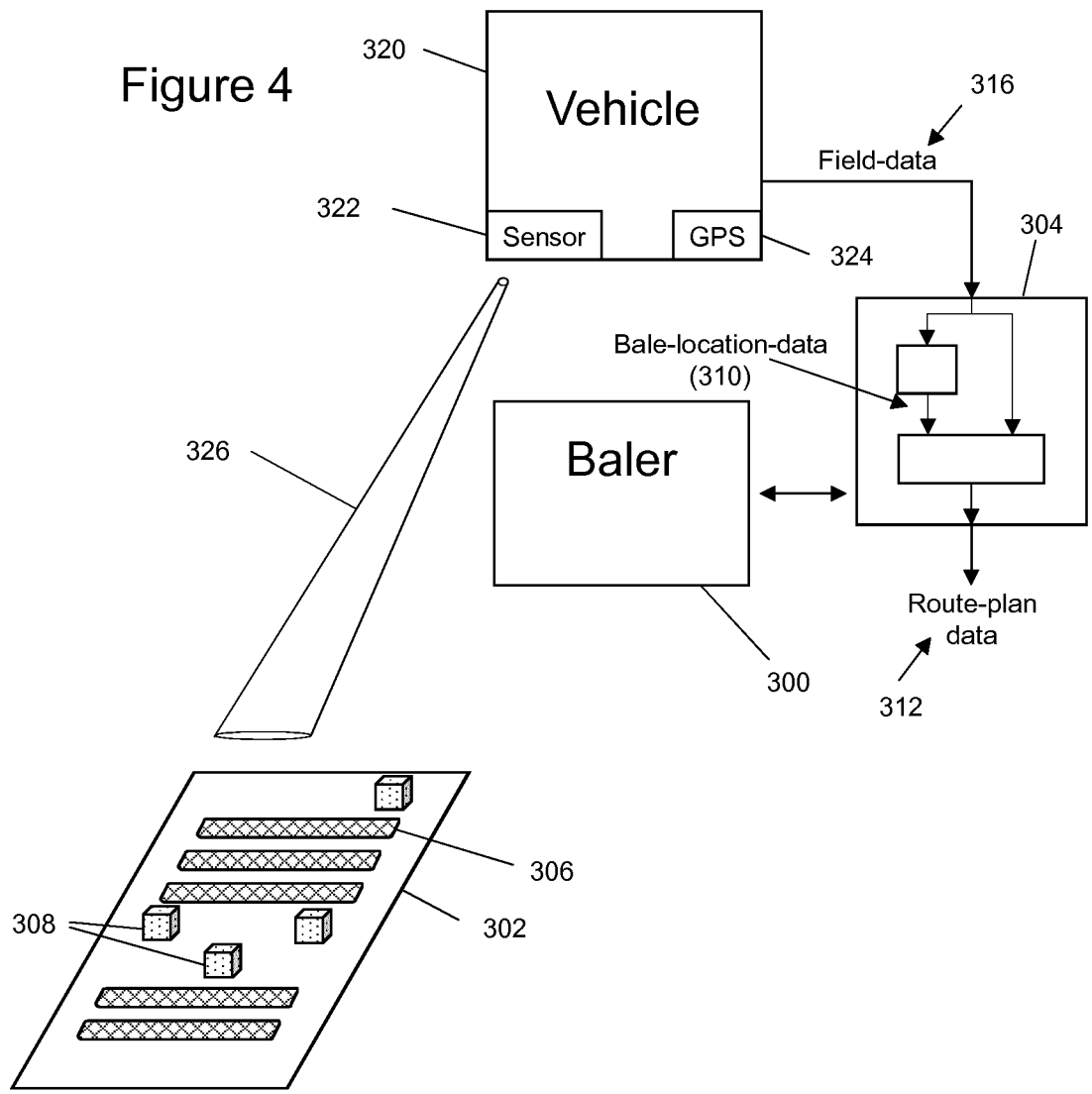

AGRICULTURAL SYSTEM

BACKGROUND OF THE INVENTION

Determining an accurate route plan for an agricultural machine in an agricultural field can enable crop material to be picked up in an efficient way, in terms of the length of time the operation takes, and the amount of fuel used by the machine, for example. In some applications, agricultural machines can be operated autonomously using such a route plan.

SUMMARY OF THE INVENTION

According to a first aspect of the invention, there is provided a system comprising: a controller associated with an agricultural vehicle, the controller configured to: determine route-plan-data that is representative of a route to be taken by the agricultural vehicle in an agricultural field, based on bale-location-data, wherein the bale-location-data is representative of the location of bales in the agricultural field.

The controller may be configured to determine the route-plan-data such that the agricultural vehicle will avoid the locations of the bales.

The controller may be configured to determine the route-plan-data such that the agricultural vehicle will deposit future bales in the vicinity of the locations of the bales in the agricultural field.

The agricultural vehicle may be a baler.

The controller may be further configured to: receive field-data that is representative of crop material that is to be picked up from the agricultural field by the agricultural vehicle; and determine the route-plan-data also based on the field-data.

The controller may be configured to receive updated field-data as the agricultural machine picks up the crop material from the agricultural field.

The controller may be configured to determine the route-plan-data by modifying an earlier route plan whilst the agricultural vehicle is in use in the agricultural field.

The route-plan-data may comprise a sequence of locations that the agricultural vehicle will pass.

The controller may be configured to determine vehicle-control-instructions for the agricultural vehicle, based on the route-plan-data. The vehicle-control-instructions may comprise vehicle-steering-instructions for automatically controlling the direction of travel of the agricultural vehicle. The vehicle-control-instructions may further comprise route-speed-instructions for automatically controlling the speed of the agricultural vehicle at locations along the route.

The system may further comprise: an unmanned vehicle configured to acquire: field-data, representative of an agricultural field that has one or more bales located in it; and field-location-data associated with the field-data.

The controller may be configured to determine the bale-location-data based on the field-data and the field-location-data.

The controller may be further configured to: determine bale-dimension-data that is representative of the size of the one or more bales, based on the field-data; and determine the bale-location-data based on the bale-dimension-data.

The controller may be configured to: receive baler-data from a baler that deposits the bales in the agricultural field; and determine the bale-location-data based on the baler-data.

The baler-data may comprise: baler-location-data representative of the location of the baler at an instant in time that the baler deposits a bale in the field; and/or bale-dimension-data that is representative of the size of the bale.

The route-plan-data may be representative of a route to be taken by the agricultural vehicle for an entire unprocessed portion of the agricultural field. In this way, the route-plan-data can use a (revised) map of the unprocessed swath, based on the actual path that the agricultural vehicle has already taken in the field. This would not necessarily have been known at the start of the operation, because the route-plan may have been dynamically modified after the start of the operation.

The system may further comprise an agricultural vehicle that is configured to be operated in accordance with the vehicle-control-instructions.

There may be provided a computer-implemented method of:

determining route-plan-data that is representative of a route to be taken by an agricultural vehicle in an agricultural field, based on bale-location-data, wherein the bale-location-data is representative of the location of bales in an agricultural field.

There may be provided a method of controlling an agricultural machine, the method comprising:

determining route-plan-data that is representative of a route to be taken by an agricultural vehicle in an agricultural field, based on bale-location-data, wherein the bale-location-data is representative of the location of bales in the agricultural field;

determining vehicle-control-instructions for the agricultural vehicle, based on the route-plan-data; and operating the agricultural vehicle in accordance with the vehicle-control-instructions.

There may be provided a computer program, which when run on a computer, causes the computer to configure any apparatus, including a controller, processor, machine, vehicle or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which:

FIG. 4 shows schematically a further system that is associated with determining a route for a baler to follow in an agricultural field.

DETAILED DESCRIPTION OF THE DRAWINGS

Figure 1:
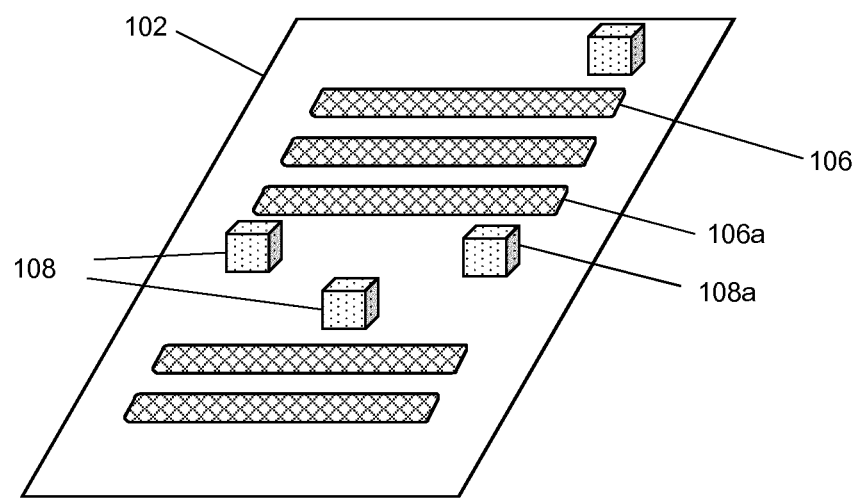
FIG. 1 shows an example of an agricultural field.
Figure 2:
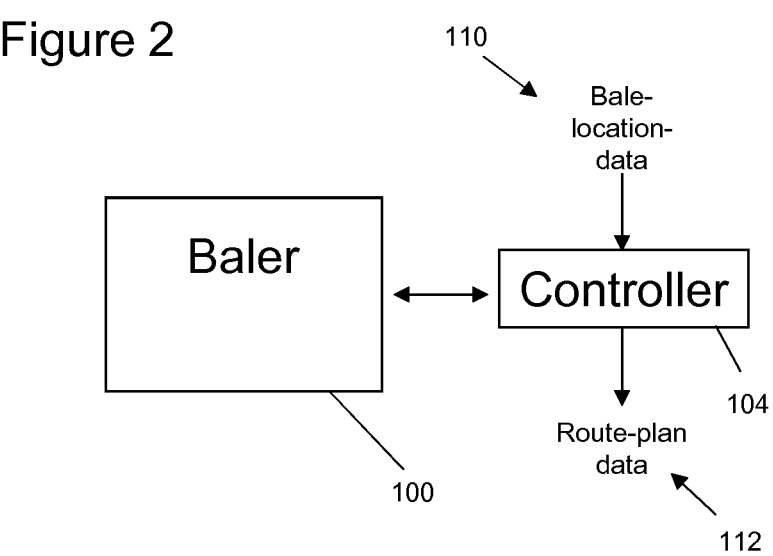
FIG. 2 shows schematically a system that is associated with determining a route for an agricultural vehicle to follow in an agricultural field.

FIG. 2 shows schematically a system that is associated with determining a route for an agricultural vehicle to follow in an agricultural field 102, as shown in FIG. 1. In this example, the agricultural vehicle is a baler 100. The system includes a controller 104 that is associated with the baler 100. It will be appreciated that the controller 104 can be located on the baler 100, or remotely from the baler 100. For example, the functionality of the controller 104 can be performed on a remote server, such as one "in the cloud".

The field 102 includes rows of crop material, which may be hay, straw or similar products that have been left in the field 102 in the form of swaths 106. The swaths 106 are elongate rows of the products in question that are heaped in the transverse centre and tend to flatten at the respective transverse edges. Typically a field 102 that has undergone harvesting contains many, essentially mutually parallel, swaths 106, as shown in FIG. 1. The swaths are spaced from one another by largely consistent gaps. The crop material in the swaths 106 can be picked up by the baler 100, and then deposited in the field 102 as bales 108. The field 102 that is shown in FIG. 1 has been partly processed, in that it includes both rows of swath 106 for baling, and also completed bales 108. It will be appreciated that more than one baler 100 may be working in the same field 102 simultaneously.

The controller 104 associated with the baler 100 receives bale-location-data 110 that is representative of the location of the bales 108 in the agricultural field 102, and determines route-plan-data 112. The route-plan-data 112 is representative of a route to be taken by the baler 100 in the agricultural field, based on the bale-location-data 110. As will be discussed in detail below, such processing can enable a route plan for the baler 100 to be adapted in real-time, whilst the baler 100 is in the field 102, to avoid the locations of bales 108 that have been dropped in the field 102 after the baler 100 (or another baler) started processing the swaths 106 in the field 102.

In some examples the controller 104 can determine the route-plan-data 112 by modifying an earlier route plan whilst the baler 100 is in use in the field 102. For instance, an initial route plan can be generated for the baler 100 to pick up the swaths 106 of crop material. However, when that initial route plan is generated, it may not be possible to accurately determine where the baler 100 is going to deposit bales 108 in the field. If a bale 108a is deposited near a headland at the end of a row of swath 106a, then that bale 108a may inhibit the baler 100 from turning into an adjacent row of swath 106a from a certain direction. That is, if the baler 100 turned into the adjacent row of swath 106a with a left turn, then the baler 100 (or a tractor pulling the baler if it is not self-powered) may drive over the bale 108a and destroy it. Whereas, if the baler 100 turned into the adjacent row of swath 106a with a right turn, then the baler 100 can avoid the bale 108a.

The route-plan-data 112 can comprise a sequence of locations for the baler 100 to pass when picking up the crop material in the swaths 106. For example, the controller 104 can determine a shortest possible route for picking up all of the crop material, whilst avoiding the bales 108 that have already been deposited in the field 102.

In examples where the baler 100 is pulled by a tractor, the route-plan-data 112 can include baler-route-plan-data and tractor-route-plan-data. In this way, the controller 104 can ensure that both the baler 100 and the tractor avoid the bales 108. It may only be necessary to provide the tractor-route-plan-data as an output because it is this data that can be used by an operator to drive the tractor such that the baler 100 follows the desired route. Alternatively, the tractor can be controlled autonomously using the tractor-route-plan-data, such that the baler 100 follows the desired route. It will be appreciated that any description in this document of controlling the baler 100, can equally apply to controlling a tractor that is pulling the baler 100. This is because any such control of the tractor can be considered as indirectly controlling the baler 100.

The route-plan-data 112 can be representative of a route to be taken by the baler 100/tractor for an entire unprocessed/un-baled portion of the field 102. That is, the route-plan-data 112 can be determined such that it takes into account the portions of the field 102 that have already been baled, whilst ensuring that a route is planned for baling the crop material in each of the remaining swaths 106.

Figure 3:
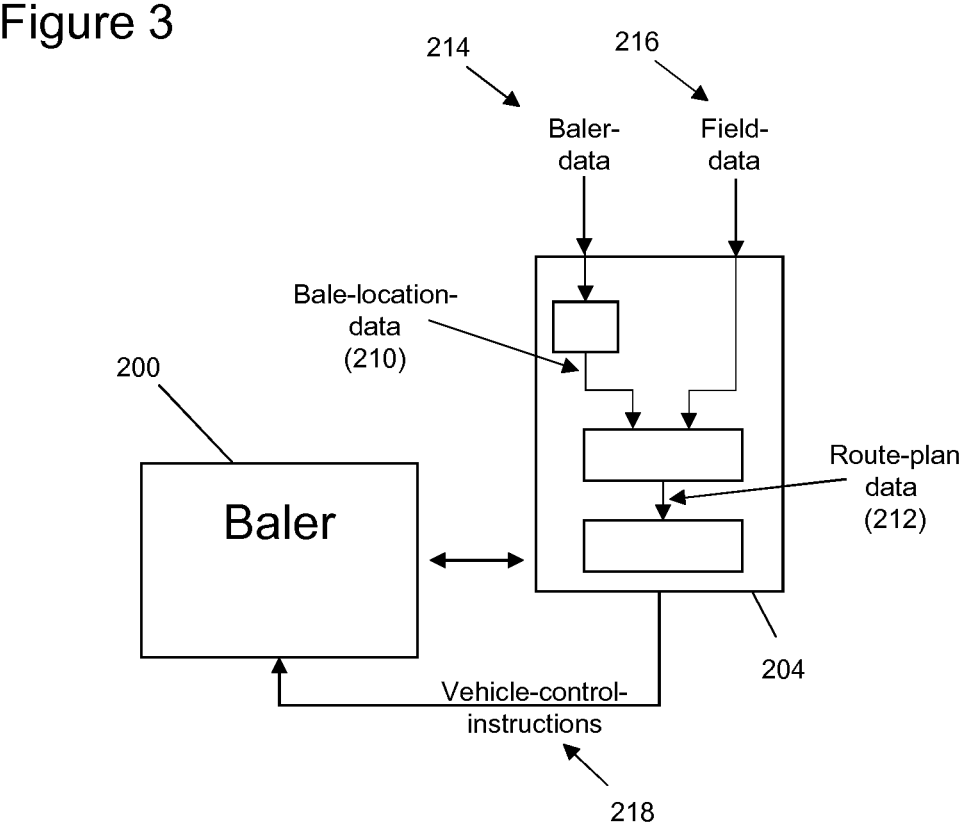
FIG. 3 shows schematically another system that is associated with determining a route that a baler can follow in an agricultural field.

FIG. 3 shows schematically another system that is associated with determining a route that a baler 200 can follow in an agricultural field (as shown in FIG. 1). The system includes a controller 204 and the baler 200. The controller 204 can be used to autonomously control the baler 200 (or a tractor that pulls the baler 200). That is, the system can be considered as including the baler 200 that is configured to be operated in accordance with vehicle-control-instructions.

In this example the controller 204 receives baler-data 214, and determines bale-location-data 210 based on the baler-data 214. The baler-data 214 can be received from a baler 200 that deposits the bales in the agricultural field. This could be the same baler 200 that the route is being prepared for, or a different baler if more than one baler is working the same field. For instance, inter-vehicle communication can be used if there is more than one machine/baler working on the field. In this way, they can communicate to share their information about obstacles/bales. This communication can be direct or indirect, such as through "the cloud".

As will be appreciated from the following description, if the "other vehicle" is another (autonomous) baling machine, then it can send one or more of the estimated location, orientation, dimensions and drop time of bales that have already been dropped, and/or a future bale that is to be dropped, for example using a bale-drop-estimation algorithm. An example of a bale-drop-estimation algorithm will be discussed in more detail below.

The baler-data 214 can include baler-location-data representative of the location of the baler 200 at instants in time that the baler 200 deposits bales in the field. Such information may be stored, and made available, each time the baler 200 deposits a bale. The controller 204 can determine the bale-location-data 210 as a single set of coordinates for each bale. The single set of coordinates may be representative of the location of the expected centre of the bale, for example, and could be calculated by the controller 204 applying an offset to the location of the baler 200 (as determined from the baler-location-data) when the bale was dropped. The offset can be indicative of a distance between: (i) a location-determining-module (such as a GPS receiver) that is fitted to the baler 200; and (ii) an exit point of the baler 200 from which the bale is dropped. The controller 204 can apply the offset to the location of the baler 200 in a direction that is opposite to the direction of travel of the baler 200 when the bale was dropped.

In some examples, the baler-data provided by the baler 200 may also include bale-dimension-data, which is representative of the size and/or shape of the bale. The bale-dimension-data may be fixed/hard-coded for a specific baler, or it may be determined using one or more sensors that measures the dimensions of each individual bale that is produced. In such examples, the controller 204 can determine the bale-location-data 210 as multiple sets of coordinates for each bale. The multiple sets of coordinates may be representative of the locations of one or more corners of the bale, for example, and may be sufficient such that, together, they can be used to determine the perimeter of a two-dimensional footprint of the bale (when viewed from above), or to determine the perimeter of the three-dimensional volume of the bale.

The controller 204 can determine the multiple sets of coordinates by applying offsets to the location of the baler (baler-location-data) when the bale was dropped. The controller 204 can determine the offsets based on the bale-dimension-data. Optionally, the controller 204 can also determine the offsets based on a distance between: (i) a location-determining-module that is fitted to the baler 200; and (ii) an exit point of the baler 200 from which the bale is dropped.

The controller 204 can then determine route-plan-data 212, which is representative of a route to be taken by the baler 200 in the agricultural field, based on the bale-location-data 210 that was calculated using the baler-data 214.

In this example, the controller 204 determines vehicle-control-instructions 218 for the baler 200, based on the route-plan-data 212.

The vehicle-control-instructions 218 can comprise vehicle-steering-instructions for automatically controlling the direction of travel of the baler 200, such that the baler 200 follows a specific route through the agricultural field. In this way, the baler 200 can be autonomously controlled such that it follows a specific route through the agricultural field in order to pick up crop material from the field. In addition to, or instead of, avoiding bales that have already been deposited in the field, as discussed above, the route can be planned such that it provides one or more advantages, for example:

(i) efficient baler/tractor usage, such as low overall fuel consumption to pick up and bale all of the crop material from the field;

(ii) efficient baling in terms of the time required to bale all of the crop material in the field; and (iii) prioritising pick up of crop material with particular characteristics (as defined by crop-property-data for example, as will be discussed below), such as portions of swath that have a high volume of crop material; and (iv) dropping bales close to each other, for example, to drop future bales in the vicinity of existing bales, where possible. This can make the subsequent collection of the bales more efficient. "In the vicinity of" can be implemented by an algorithm that minimises the distance between adjacent bales and/or attempts to drop future bales less than a threshold-distance away from an adjacent bale.

A route that is planned so that bales are dropped close to each other can find particular application for grass baling, for example if there are a lot of small fields to be baled, with small/short swaths. In such examples, less than 1 bale may be generated per row of swath, in which case the route can be planned such that bales are dropped in adjacent swaths to optimize the gathering of the bales. Also, in some specific situations, the route can be planned such that the baler skips a part of the swath (for example by elevating a pick-up on the baler) in order to optimize bale drop locations. Then the skipped portions of the swath can be picked up and baled afterwards. Although this might add some time to the baling process, it can gain efficiency during bale gathering.

In some examples, the controller 204 can also use baler-location data and/or baler-direction-data, that is representative of a current location and direction of travel of the baler 200 for which the route plan is being determined, to determine the route-plan-data 212.

The vehicle-control-instructions can also comprise route-speed-instructions for automatically controlling the speed of the baler 200 at locations along the route. For instance, the vehicle-control-instructions can also comprise vehicle-steering-instructions and route-speed-instructions such that the baler 200 can make a turn in the field with a desired turning angle, at an appropriate speed for the turn, such that the baler 200 avoids bales that have already been deposited in the field.

In this example, the controller 204 also receives field-data 216, which is representative of an agricultural field that is to be processed by the baler 200. For example, the field-data 216 is representative of the swaths of crop material that are to be picked up from the field by the baler. In one instance, the field-data 216 can be representative of the location of the swaths of crop material that are still to be baled. The field-data 216 can also be representative of one or more properties of the swaths of crop material. In some examples, the controller 204 receives updated field-data 216 as the baler 200 picks up the crop material from the field.

The controller 204 can determine the route-plan-data 212 also based on the field-data 216. In this way, both the locations of the bales, and properties of the un-baled swaths (such as the locations of the swaths), can be used to determine the route-plan-data 212. In other examples, the field-data 216 can be used to determine the bale-location-data 210, as will be discussed detail below with reference to FIG. 4.

As indicated above, a bale-drop-estimation algorithm can be used to determine bale-location-data that is representative of the location at which bales will be dropped in the agricultural field in the future. This can allow the baler 200 to adapt its trajectory before a bale has been physically dropped. For example, where the 3D volume data of the swath is available, the bale-drop-estimation algorithm can estimate a future bale drop location based on a density-setting that the machine is using (which is representative of the intended crop density in the bale). This approach can also optionally use material-density-values that are representative of the density of the uncompressed swath when it is lying in in the field. The material-density-value may have a predetermined/assumed value. In some examples, the bale-drop-estimation algorithm can dynamically adjust the material-density-value based on a feedback signal. For example, the feedback signal may be representative of the swath-volume-data and/or a measured bale weight at the bale chute. If the swath-volume-data is available, then a controller can determine the volume (for example in $m^3$) of uncompressed crop that has been used to form a bale. Then, when the bale is formed, the weight of the bale can measured (for example in kg) when it is on the bale chute. Therefore, the controller can divide the bale weight [kg] by the uncompressed crop volume [$m^3$], to determine the average swath-density [$kg/m^3$] for that bale, and the controller can use this value as an estimation of the likely density for future bales.

In another example, the bale-drop-estimation algorithm can receive an input-signal that is representative of measured/sensed material-density-values. This can enable the algorithm to more accurately predict the locations of further bale drops. Irrespective of how the material-density-values are determined, it will be appreciated that the bale-drop-estimation algorithm can apply a correction to the material-density-value for the specific type of crop that is being processed.

Inputs for a bale-drop-estimation algorithm that can be performed for bales that are to be dropped by "an other" baler, or the baler 200, can include one or more of:

swath-location-data, which is representative of the location of swath that is still to be baled;

crop-property-data, which, as discussed below can be representative of the crop material in the agricultural field, and can include material-density-values;

driving speed, which can be current driving-speed or planned future driving-speed of the baler as it follows a route;

GPS-data, which can be current GPS-data;

length wheel-data (data coming from a starwheel in a bale chamber), which can be used as a feedback signal to check if the estimated slice thickness corresponds with the actual slice thickness. If there is an error, then parameters of the bale-drop-estimation algorithm can be adjusted so that the estimated slice thickness more closely corresponds with the actual slice thickness, and therefore the accuracy of the bale-drop-estimation algorithm can be improved;

knotter signal, which is representative of when a bale has ended and a new bale has started to form. It can also be used as a feedback signal for fine-tuning parameters of the bale-drop-estimation algorithm; and desired trajectory, which can be representative of a planned route for the baler.

FIG. 4 shows schematically a further system that is associated with determining a route for a baler 300 to follow in an agricultural field 302. Features of FIG. 4 that are also shown in FIG. 2 or FIG. 3 have been given corresponding reference numbers in the 300 series, and will not necessarily be described again here.

The system includes a vehicle 320. In this example the vehicle is an unmanned vehicle 320. The unmanned vehicle 320 can be an unmanned aerial vehicle (sometimes referred to as a drone). In other examples, the vehicle 320 could be a land vehicle, which may or may not be unmanned.

The unmanned vehicle 320 can include one or more sensors for obtaining field-data 316, and a field of view 326 of such a sensor is shown schematically in FIG. 4.

In this example, the unmanned vehicle 320 includes a sensor 322 that can acquire field-data 316. In this example the sensor 322 is a camera that can acquire field-image-data. The field-image-data can be two-dimensional-image-data or three-dimensional-image-data, and in some examples the camera can be a 3D-scanner or 3D-camera.

Alternatively, or additionally, the field-data 316 can include: field-radar-data acquired by a radar, field-LIDAR-data acquired by a LIDAR sensor; field-moisture-data acquired by a moisture-sensor, field-IR-data acquired by an infra-red-sensor, ultrasonic-data acquired by an ultrasonic sensor, or any other type of field-data from any type of sensor that can acquire information about the agricultural field 302 or the crop material in the agricultural field 302. The controller 304 can process one or more of these different types of field-data 316, either directly or indirectly, in order to determine the route-plan-data 312, and optionally vehicle-control-instructions (not shown).

In some examples, the controller 304 can determine crop-property-data that is representative of the crop material in the agricultural field 302, based (directly or indirectly) on the field-data 316. For instance, the controller 304 can perform an object recognition algorithm on the field-image-data in order to determine one or more of crop-type; length of stalks in the material, material density, and stub-height-information. The stub height is the height at which the crop is cut off. In some conditions, such as for wheat straw, the swath lays on top of the stubs, which causes the swath to look bigger than it actually is.

In some examples, the controller 304 can also, or instead, process different types of field-data to determine the crop-property-data. For instance, the controller 304 can process field-IR-data to determine the temperature of crop material, or the controller 304 can process field-moisture-data to determine the humidity/wetness of crop material.

In one example, the crop-property-data can include material-size-data that is representative of the size of the crop material in the agricultural field 302. Such material-size-data can include the height, width, cross-sectional area, volume, or shape of the swath 306. The crop-property-data can therefore represent one-dimensional, two-dimensional or three-dimensional physical characteristics of the crop material, and can be determined based on two-dimensional-image-data or three-dimensional-image-data.

The controller 304 can then determine the route-plan-data 312 for the baler 300 based on one or more of the above types of crop-property-data. In some examples, the controller 304 determines vehicle-control-instructions for the baler 300 based on one or more of the above types of crop-property-data. For example, the controller 304 may cause the baler 300 to travel: (i) more slowly over large portions of crop material (for instance portions that have a material-size-data (such as cross-sectional area) that is greater than a size-threshold-value); (ii) more quickly over thin portions of crop material (for instance portions that have a density that is less than a density-threshold-value), (iii) in a zig-zag path over very narrow swaths to get a good feeding of a pre-compression chamber of the baler 300; and (iv) not changing the speed too aggressively (for example such that the acceleration/deceleration of the baler 300 is not greater than a speed-change-threshold) if there is a small interruption of the swath 306 to improve driver comfort (for example, a small interruption can be identified as a height of the swath 306 that is less than a swath-height-threshold for a length of the path that is less than a path-length-threshold).

It will be appreciated that the above examples are non-limiting and that the baler can be automatically controlled based on crop-property-data in numerous other ways. In some examples, different options can be selected by the operator of the baler/tractor, such as when starting a baling operation. For instance, when starting a field, the operator may be able to enter a 'setting' such as the following:

If I hit a wet spot: how should the controller control the baler/tractor—slow down the speed and continue baling or lift the pick-up; and/or If a highly compressed swath is detected: how should the controller control the baler/tractor—slow down the speed and continue baling or lift the pick-up.

In this way, the controller can determine vehicle-control-instructions for the baler 300 based on: (i) one or more of the above types of crop-property-data; and (ii) user input.

Therefore, in a number of ways, the controller 304 can determine vehicle-control-instructions and/or route-plan-data 312 based on the crop-property-data. For instance, the controller 304 may plan the route for the baler 300 such that regions of the crop material with a higher density are picked up before regions of the crop material that have a lower density. This may be advantageous so that the most valuable crop material (in terms of volume of crop per distance travelled by the baler 300) is picked up first. In another example, the controller 304 may plan the route such that the baler 300 picks up regions of the crop material that have a lower humidity before regions of the crop material that have a higher humidity. In this way, the more humid crop material will have longer to dry out. As a further example, the controller 304 can determine the route-plan-data 312 for the baler 300 based on the time of day that the crop material is to be picked up and/or a measured or predicted temperature of the crop material. It can be advantageous for the crop material to be as cool as possible for baling (for better friction properties). Therefore, the route-plan-data 312 can be planned such that the crop material that is picked up is likely to be below a crop-temperature-threshold. As yet further example, the controller 304 can determine the route-plan-data for the baler 300 based on the humidity/wetness of crop material such that wet spots of the crop material can be baled after each other so as not to mix wet and dry crop in the same bales.

The controller 304 can determine field-property-data that is representative of a property of the agricultural field 302, based on the field-data 316. For instance, the controller 304 can determine first regions of field-data that correspond to the swaths 306 of crop material, and second regions of the field-data that correspond to the agricultural field 302 (outside the perimeter of the first regions of field-data). As discussed above, the controller 304 can determine crop-property-data based on data that corresponds to the first regions of field-data. The controller 304 can also determine field-property-data based on the second regions, and then determine the vehicle-control-instructions and/or route-plan-data 312 based on the field-property-data.

The field-property-data can include field-wetness-data that is representative of the wetness of the agricultural field 302. In such an example, the controller 304 can process field-data to identify the locations of the second regions of the field-data that correspond to the agricultural field 302, and then determine the field-wetness-data based on field-moisture-data acquired by a moisture-sensor for the identified second regions. The controller 304 can then control the speed of the baler 300 accordingly, for example to prevent the baler 300 from travelling faster than a speed-threshold-value in parts of the field 302 that have a field-wetness-data that exceeds a wetness-threshold-value.

The field-property-data can also include field-contour-data that is representative of contours of the agricultural field 302. A user can provide the field-contour-data to the controller 304 in some examples because this data acquisition can be considered as a one-time job. In other examples, the controller 304 can determine the field-contour-data based on the field-image-data or field-radar-data, for example. The controller 304 can then determine the vehicle-control-instructions and/or route-plan-data 312 based on the field-contour-data. For instance, for regions of the agricultural field 302 that have a steep slope (for example, field-contour-data that is representative of a gradient that is greater than a gradient-threshold-value), the controller 304 may determine route-speed-instructions for automatically controlling the speed of the baler 300 such that it does not exceed a speed-threshold-value. Also, in such circumstances, the controller 304 may determine vehicle-steering-instructions that prevent a steering angle of the baler 300 from exceeding a steering-angle-threshold-value. As another example, the controller 304 can determine the route-plan-data for the baler 300 based on the field-contour-data. For example, the controller 304 can calculate a route that, for a big swath on a flank, results in the baler 300 picking up the crop material as it is travelling down a slope that has a gradient that is greater than a gradient-threshold-value. This can provide advantages because in some applications, a tractor that is pulling baler 300 may not have sufficient power to maintain its optimal speed.

In some examples, the vehicle 320 can include a height-measurement-sensor for acquiring material-height-data representative of the height of the crop material. The controller 304 can then determine the vehicle-control-instructions and/or route-plan-data 312 based on the material-height-data. For instance, the controller 304 may set the route-speed-instructions for the baler 300 based on the material-height-data, such that the baler 300 travels more slowly when the height of the crop material is relatively large. The height measurement can be used as an indicator of the size of the swath 306. If multiple height measurements are taken whilst the vehicle 320 is moving, they can be combined in order to provide a 3D-scan. The height-measurement-sensor can also be used to measure stub-height-information, which is representative of stub height, if the stub density is high enough. Irrespective of how the stub height is determined, in some examples the controller 304 can subtract the stub height from the measured height of the crop in order to determine swath-height-data. The controller 304 can then determine the vehicle-control-instructions and/or route-plan-data 312 based on the swath-height-data.

In some examples, the controller 304 can determine a bale-count, representative of an estimate of the number of bales that will be attained by picking up all of the crop material, based on the field-data 316. For instance, the controller 304 can process material-size-data (representative of the size of the crop material), and calculate total-crop-amount that is representative of the total amount of crop that is to be picked up. The controller 304 can then divide the total-crop-amount by the volume of a single bale to determine the bale-count. Providing the bale-count as an output can be useful for planning the operation of picking up the crop material. For instance, the number of trucks that will be needed to collect the bales 308, and how long the job will take, can be estimated in advance. This type of information can be particularly advantageous inputs for work planning. For instance, the controller 304 can process the total-crop-volume and/or bale-count in order to determine energy requirements of the baler 300. For example, if the total-crop-volume is very large, then the controller 304 can determine that the baler 300 will have to return at some point to a location where it can refill with more energy/fuel. Therefore, the controller 304 can determine a route that takes this into account, and/or can automatically control the baler 300 such that its available energy/fuel is used in an appropriate way for the required future refill of energy/fuel. The controller 304 can determine both an initial bale-count and/or energy requirements prior to the operation of picking up the crop material, and an updated bale-count and energy requirements during the operation.

The vehicle 320 can acquire: (i) field-data 316 that is representative of the agricultural field 302 that has one or more bales 308 located in it; and (ii) field-location-data (not shown) associated with the field-data 316. The controller 304 can optionally determine the route-plan-data 312 based on the field-data 316 and the field-location-data.

In this example, the vehicle 320 acquires field-location-data associated with field-image-data. For example, the vehicle 320 may have a location-determining-system 324, such as GPS, that provides vehicle-location-data that is representative of the location of the vehicle 320 when the field-image-data is acquired. The controller 304 may also receive camera-direction-data and vehicle-altitude-data. The camera-direction-data may be representative of the direction that the camera is facing relative to the vehicle 320. The camera-direction-data may be hard coded if the camera is non-movably fixed to the vehicle 320. If the camera is movably mounted to the vehicle 320, then the camera-direction-data can take different values, which may be received as an input-signal at the controller 304 from the vehicle 320. The controller 304 can then use a simple trigonometric algorithm to attribute field-location-data to objects/areas that are represented by the field-image-data based on the vehicle-location-data, the camera-direction-data, a vehicle-altitude-data (if the vehicle 320 is an aerial vehicle), and a direction of travel of the vehicle 320, as is known in the art.

Also, in this example, the controller 304 determines bale-location-data 310 based on the field-data 316 and the field-location-data. The controller 304 can also determine bale-dimension-data that is representative of the size of the one or more bales, based on the field-data and/or the field-location-data. As discussed above, the controller 304 can then determine the bale-location-data 310 also based on the bale-dimension-data.

Use of an aerial vehicle 320 can enable field-data 316 to be acquired from a relatively high altitude to obtain an overview of the field 302, thereby providing a wide field of view. Subsequently or alternatively, the aerial vehicle 320 can stay with the baler 300 at a lower altitude. The gathered field-data 316 can be streamed to the controller 304 and/or "the cloud". When the aerial vehicle 320 stays with the baler, one or more of the following strategies can be deployed. Firstly, the aerial vehicle 320 can fly above the baler 300 to get information about the surroundings of the baler 300. In this way, it can detect objects ahead of the baler 300 and also map the bales 308 dropping from the back of the baler 300. Secondly, the aerial vehicle 320 can fly ahead of the baler 300 to scan the future trajectory of the baler 300 for objects. Thirdly, the aerial vehicle 320 can scan the whole field 302 to get an overview of any obstacles, including bales 308. During baling, another strategy can be used: fourthly, the aerial vehicle can fly behind the baler 300 to scan the produced bales for precise coordinates and dimensions (referred to above as bale-location-data/bale-dimension-data).

It will be appreciated that one or more of the functions of the vehicle 320 that are described with reference to FIG. 4 could be implemented by the agricultural vehicle/baler 300 itself in some examples. For example, field-data and crop-property-data could be determined by processing signals acquired by sensors on the agricultural vehicle/baler 300.

One or more of the examples disclosed herein can improve the safety with which a baler operates because collisions with objects, such as bales, are less likely.

Systems described herein can dynamically map obstacles in the field during baling, and can utilise technology to gather the data for mapping the obstacles, determining a route for the baler and/or automatically controlling the baler. In some examples, a drone can be used for mapping the objects. Also, information about the bales that is produced by the baler itself, can be used.

It will be appreciated that any of the control operations disclosed herein, such as setting the speed or direction of travel of the baler or an associated tractor, can be performed by comparing data with one or more threshold values, applying an algorithm to data, or using a look-up-table/database to determine a control value based on received/determined data.

The invention claimed is:

1. A system comprising:
an unmanned aerial vehicle with at least one sensor, the sensor simultaneously gathering real-time field-data including bale-location-data and swath-location-data; and
a controller associated with an agricultural vehicle, the controller configured to:
receive the field-data from the unmanned vehicle;
determine route-plan-data that is representative of a route to be taken by the agricultural vehicle in an agricultural field, based on the bale-location-data and the swath-location data, wherein the bale-location-data is representative of locations of bales in the agricultural field and the swath-location data is representative of locations of swaths in the agricultural field, wherein the controller is configured to determine the route-plan-data such that the agricultural vehicle will travel along the swaths while avoiding the locations of the bales in the agricultural field, the route-plan-data being additionally based on the field-data that is updated as the agricultural vehicle picks up crop material in the agricultural field; and
determine the bale-location-data as multiple sets of coordinates for each bale, the multiple sets of coordinates for each bale being representative of the locations of a plurality of corners of the bale, the multiple sets of coordinates for each bale being used to determine a perimeter of each bale.

2. The system of claim 1, wherein the controller is configured to determine the route-plan-data such that the agricultural vehicle will deposit future bales in a vicinity of the locations of the bales in the agricultural field.

3. The system of claim 1, wherein the agricultural vehicle is a baler.

4. The system of claim 1, wherein the unmanned vehicle acquires the field-data, the field-data being streamed to the controller, wherein the controller is further configured to:
receive the field-data from the aerial vehicle that is representative of crop material that is to be picked up from the agricultural field by the agricultural vehicle; and
determine the route-plan-data also based on the field-data.

5. The system of claim 4, wherein the controller is further configured to receive updated field-data as the agricultural machine picks up the crop material from the agricultural field, and the multiple sets of coordinates for each bale additionally being used to determine a three-dimensional volume of each bale.

6. The system of claim 1, wherein the controller is configured to determine the route-plan-data by modifying an earlier route plan whilst the agricultural vehicle is in use in the agricultural field.

7. The system of claim 1, wherein the controller is further configured to determine vehicle-control-instructions for the agricultural vehicle, based on the route-plan-data.

8. The system of claim 7, wherein the vehicle-control-instructions comprise vehicle-steering-instructions for automatically controlling a direction of travel of the agricultural vehicle.

9. The system of claim 8, wherein the vehicle-control-instructions further comprise route-speed-instructions for automatically controlling a speed of the agricultural vehicle at locations along the route, the at least one sensor including a height-measurement-sensor for acquiring material-height-data representative of the stub height of the crop material.

10. A system comprising:
an unmanned aerial vehicle configured to acquire:
real-time field-data, representative of an agricultural field that has one or more bales located in it, the field-data including bale-location-data and swath-location-data; and
field-location-data associated with the field-data; and a controller associated with an agricultural vehicle, the controller configured to:
  determine route-plan-data that is representative of a route to be taken by the agricultural vehicle in the agricultural field, based on the bale-location-data and the swath-location-data, wherein the bale-location-data is representative of locations of the one or more bales in the agricultural field and the swath-location data is representative of locations of swaths in the agricultural field, wherein the controller is configured to determine the route-plan-data such that the agricultural vehicle will travel along the swaths while avoiding the locations of the bales in the agricultural field,
  wherein the controller is further configured to determine the bale-location-data based on the field-data and the field-location-data, the field-data being updated as the agricultural vehicle picks up crop material in the agricultural field, and determine the bale-location-data as multiple sets of coordinates for each bale, the multiple sets of coordinates for each bale being representative of the locations of a plurality of corners of each bale, the multiple sets of coordinates for each bale being used to determine a perimeter of a two-dimensional footprint of each bale.

11. The system of claim 10, wherein the controller is further configured to:
  determine bale-dimension-data that is representative of sizes of the one or more bales, based on the field-data; and
  determine the bale-location-data based on the bale-dimension-data.

12. The system of claim 10, wherein the controller is configured to:
  receive baler-data from a baler that deposits the bales in the agricultural field; and
  determine the bale-location-data based on the baler-data, the unmanned aerial vehicle mapping the bales dropping from the back of the baler.

13. The system of claim 12, wherein the baler-data comprises:
  baler-location-data representative of a location of the baler at an instant in time that the baler deposits a bale in the field; and
  bale-dimension-data that is representative of a size of the bale.

14. The system of claim 10, wherein the route-plan-data is representative of a route to be taken by the agricultural vehicle for an entire unprocessed portion of the agricultural field.

15. The system of claim 7, wherein the system further comprises the agricultural vehicle, the agricultural vehicle configured to be operated in accordance with the vehicle-control-instructions.

16. The system of claim 1, wherein properties of un-baled swaths of the crop material from the field data is additionally used to determine the route-plan-data.

17. The system of claim 1, wherein a bale-drop-estimation algorithm is used to also determine bale-location-data that is representative of a future bale drop location at which bales will be dropped in the agricultural field at a future time, the bale-drop-estimation algorithm estimating the future bale drop location based on a density of un-baled swaths of the crop material from the field data, the bale-drop-estimation being additionally used to determine the route-plan-data.

* * * * *